H. A. GENTZEL.
ELECTRIC RAT EXTERMINATOR.
APPLICATION FILED AUG. 5, 1912.
1,072,222.
Patented Sept. 2, 1913.
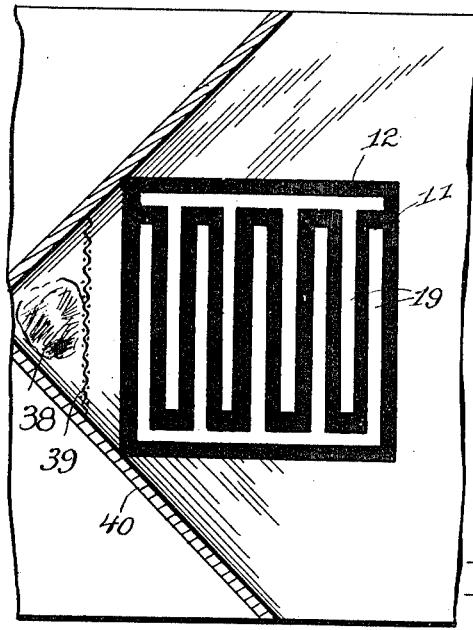
Fig. 4.
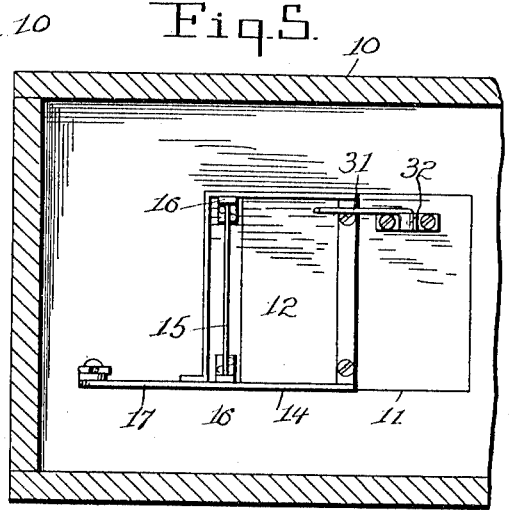
Fig. 5.
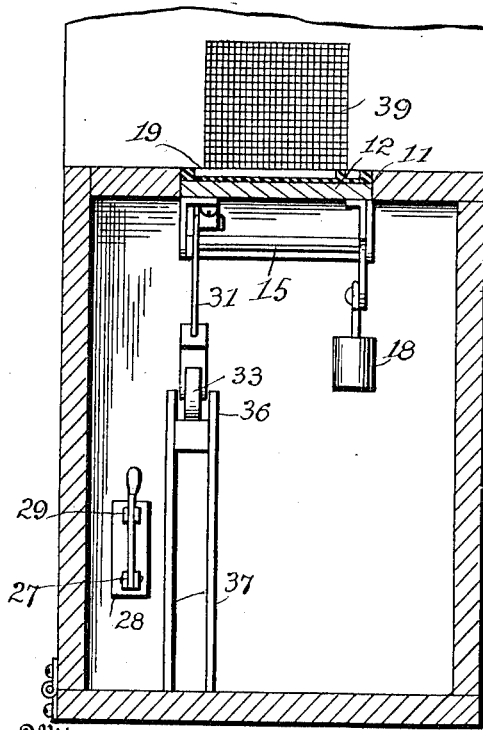
Fig. 6.
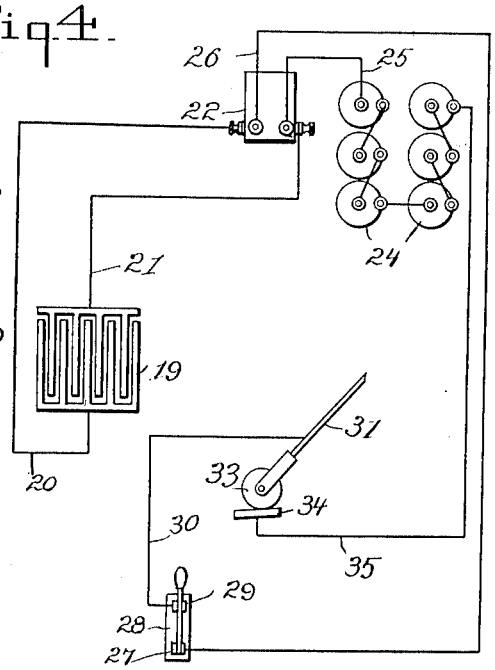
Fig. 8.
Inventor
H. A. Gentzel
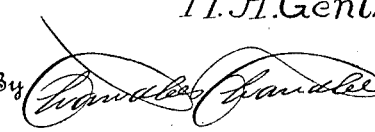
Attorneys

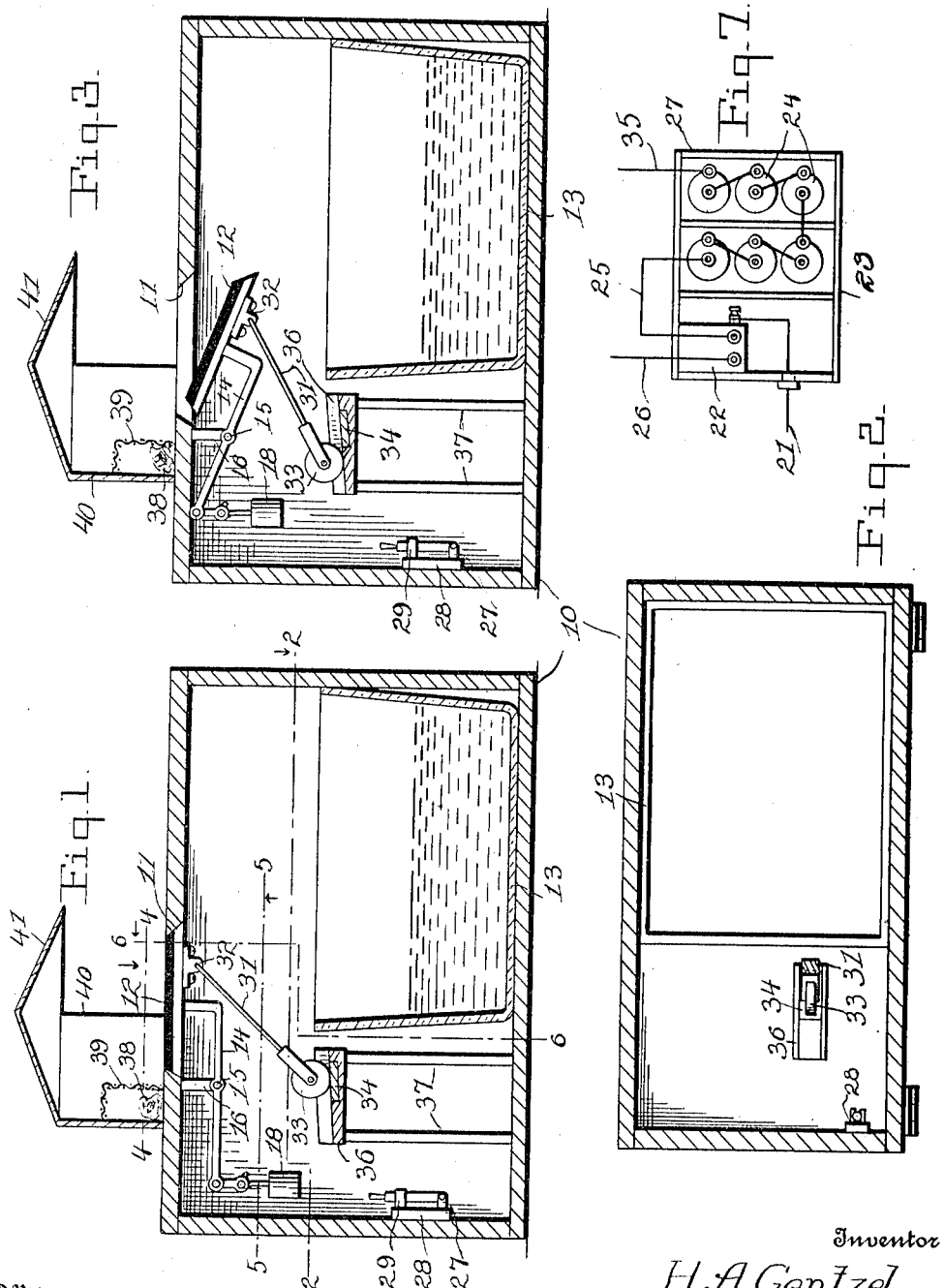

UNITED STATES PATENT OFFICE.

HARRY A. GENTZEL, OF NEW BRIGHTON, PENNSYLVANIA.

ELECTRIC RAT-EXTERMINATOR.

1,072,222. Specification of Letters Patent. Patented Sept. 2, 1913.

Application filed August 5, 1912. Serial No. 717,308.

*To all whom it may concern:*

Be it known that I, HARRY A. GENTZEL, a citizen of the United States, residing at New Brighton, in the county of Beaver and State of Pennsylvania, have invented certain new and useful Improvements in Electric Rat-Exterminators; and I do hereby declare the following to be a full, clear, and exact description of the invention, such as will enable others skilled in the art to which it appertains to make and use the same.

This invention relates to electrocuting traps and has for an object to provide a novel trap door which will electrocute and discharge the dead rodents into an acid bath which will entirely consume the bodies.

With the above objects in view the invention consists of certain novel details of construction and combination of parts hereinafter fully described and claimed, it being understood that various modifications may be made in the minor details of construction within the scope of the appended claim.

In the accompanying drawings forming part of this specification:—Figure 1 is a longitudinal sectional view through the trap. Fig. 2 is a horizontal sectional view taken on the line 2—2 Fig. 1. Fig. 3 is a longitudinal sectional view through the trap showing the trap door sprung. Fig. 4 is a cross sectional view taken on the line 4—4 Fig. 1. Fig. 5 is a cross sectional view taken on the line 5—5 Fig. 1. Fig. 6 is a vertical sectional view taken on the line 6—6 Fig. 1. Fig. 7 is a plan view of the source of electrical energy. Fig. 8 is a diagrammatic view of the electrical connection.

Referring now to the drawings in which like characters of reference designate similar parts, 10 designates a casing which is provided in the top with an opening 11 which is normally closed by a trap door 12 formed of insulating material. A tank 13 is carried within the casing and is preferably filled with a corrosive agent such as sulfuric acid or the like to consume the bodies of rodents precipitated thereinto by the trap door into the tank.

A substantially rectangular frame 14 is fixed at one end to the trap door and is provided with a shaft 15 which is journaled in bearings 16 that depend from the top of the casing, the frame being further provided with an arm 17 which is terminally equipped with a weight 18. This mechanism pivotally supports the trap door in closed position, the weight counterbalancing the trap door and serving to return the same to closed position after each operation.

The trap door is provided on the top face with two interfitting copper plates 19 which are each composed of a plurality of parallel fingers, the fingers being all insulated from each other by being preferably embedded in the top face of the trap door. One of the plates is connected by a wire 20 to one secondary pole of an induction coil 22, and the other plate is connected by a conductor wire 21 to the other secondary pole of the induction coil 22. The induction coil is preferably inclosed in a casing 23 which may be placed near the trap and contains a plurality of battery cells 24, the cells being connected in series and one pole of the terminal cell of the series being connected by a conductor wire 25 to one of the primary poles of the induction coil. The other primary pole of the induction coil is connected by a wire 26 to one pole 27 of a knife switch 28 in the trap casing 10, the other pole 29 of the knife switch being connected by a wire 30 to a trolley arm 31 which is pivotally connected at the upper ends to the under side of the trap door by a hinge 32.

The trolley wheel 33 contacts with a metal shoe 34 which is connected by a conductor wire 35 to the other pole of the terminal battery cell as shown. A U-shaped housing 36 supports the shoe and extends beyond the ends of the latter, the housing being carried upon the tops of legs 37 secured to the bottom of the trap casing.

Upon a rodent advancing over the trap door to secure a lure which will be presently described, the rodent must step upon both of the copper plates 19 and will complete a circuit between these plates, the high tension current instantly electrocuting the rodent. The weight of the rodent springs the trap door. The trolley wheel runs off from the shoe 34 at a certain point in the downward movement of the trap door and breaks the primary circuit of the induction coil, thereby breaking the secondary of the induction coil. The body then slides off from the trap door into the tank and is consumed by the corrosive agent therein. If the body becomes wedged between the trap door and top of the casing of the trap, the primary circuit or battery circuit being broken as above described will prevent a waste of electricity after electrocution of the rodent.

The lure or bait 38 is inclosed in a wire mesh container 39 that is supported upon the top face of the trap casing at the rear of the trap door and is housed on two sides by the side of a V-shaped casing 40. The casing is provided on the top with a V-shaped hood 41 which prevents the rodent from gaining access to the bait through the top of the casing 40.

What is claimed, is:—

The combination of a counterbalanced trap door, bare electrical terminals on the top face thereof, an induction coil operatively connected to said terminals, a trolley arm hingedly connected to the bottom face of said trap door, a shoe contacting with said trolley arm, and a source of electrical energy connected in series with said trolley arm, said shoe and the primary of said induction coil, said trolley arm being adapted to run off of said shoe at a certain stage in the dumping movement of said trap door and break the primary circuit of said induction coil.

In testimony whereof, I affix my signature, in presence of two witnesses.

HARRY A. GENTZEL.

Witnesses:
  OTTO C. GROSSGLASS,
  GEO. SYMMONDS.

Copies of this patent may be obtained for five cents each, by addressing the "Commissioner of Patents, Washington, D. C."